J. ROOT.
Cook Stove.
No. 160. Reissued Jan. 22, 1850.
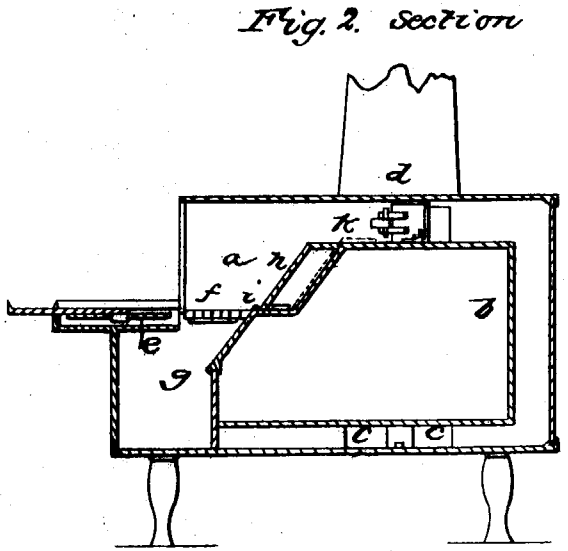
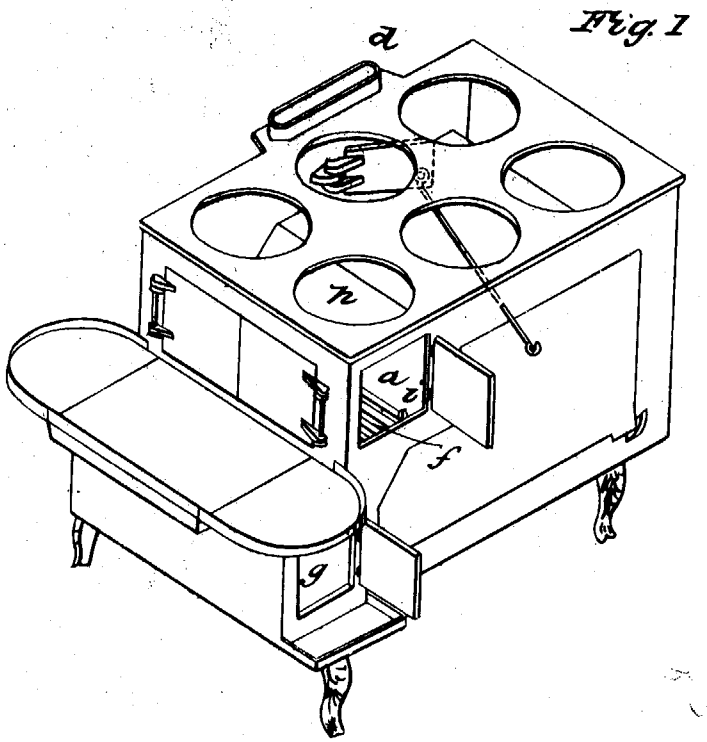
N. PETERS, Photo-Lithographer, Washington, D. C.

UNITED STATES PATENT OFFICE.

JAMES ROOT, OF CINCINNATI, OHIO.

IMPROVEMENT IN STOVES.

Specification forming part of Letters Patent No. 5,669, dated July 18, 1848; Reissue No. 160, dated January 22, 1850.

*To all whom it may concern:*

Be it known that I, JAMES ROOT, of Cincinnati, in the county of Hamilton and State of Ohio, have invented new and useful Improvements in Cooking-Stoves; and I do hereby declare that the following is a full, clear, and exact description of the principle or character which distinguishes them from all other things before known, and of the manner of making, constructing, and using the same, reference being made to the accompanying drawings, making part of this specification, in which—

Figure 1 is an isometrical view; Fig. 2, a longitudinal vertical section.

The same letters denote like parts in both the figures.

The nature of my improvement consists in carrying the ash-pit under the sunk hearth of the stove, so as to enlarge the oven, and in the manner of constructing and arranging the independent back plate of the fire-chamber, so as to readily enlarge or contract said chamber and direct the ashes into the pit beneath.

The stove in its exterior is of a common oblong form, having the fire-chamber in the upper front part thereof, as shown by letter *a*, and is in part over the front of the oven. Behind it the oven rises as high as the back plate of the fire-chamber. The flue from the fire-chamber is formed between the top of the oven and the top plate of the stove, in which the drawings show six boiler-holes. (These parts are like my former stove, as is the farther course of the flue down the whole width of the oven-back at *b*, Fig. 2, and thence under the bottom and into the flue *c* on one side that extends up to the top, where the pipe is joined at *d*.) The front part of the stove extends under the hearth *e*, similar to the stove of Buck. This extension is partitioned off from the oven, and serves as the ash-pit *g*. The top of the inner half being covered with the fire-grate *f*, it will be perceived that this forms a large receptacle for ashes and does not contract the oven. It will also be perceived that the ashes from the sunk hearth can also be precipitated into the same pit. The back of the fire-chamber is inclined, the upper part of the oven in front conforming thereto, and in addition to the plate which forms the front of the oven at that point I introduce another loose plate, *h*, the upper edge of which has a flange thereon. This plate, when the fire-chamber is to be contracted, is brought forward into the position shown in Fig. 2, the lower edge resting against a projection, *i*, on the bottom of the fire-chamber, and the back edge of the flange resting against the top oven-plate of the stove; but when the fire-chamber is to be the full size, the loose plate is carried back against the oven-plate with the flange over the top plate. (This is shown by the red lines *k*, same figure.) The size of the chamber is thus altered by a cheap and efficient fixture, which also serves to protect the other plates adjoining the fire, and one that can, when injured by the heat, be easily replaced.

Having thus fully described my improvements, what I claim as my invention, and desire to secure by Letters Patent, is—

1. The movable back-plate, *h*, for contracting the fire and protecting the oven-plates, as herein set forth; and I wish it to be understood that I do not claim the employment of double plates at the back of the fire when such plates are stationary, but only when made movable, so that the front and top plates of the oven are always protected back as far as the flange on the movable plate extends.

2. In combination with the elevated fire-chamber and projecting oven under a part of said fire-chamber, the ash-pit formed by projecting the bottom and sides of the stove under the sunk hearth, which is level with the bottom of said fire-chamber.

JAMES ROOT.

Witnesses:
EBENEZER HARRISON,
DAVID S. SMITH.